Nov. 8, 1960  J. B. DECKER ET AL  2,958,902
ROLLER PRESS FOR THE BRIQUETTING OF
ORE, COAL OR SIMILAR MATERIALS

Filed Feb. 19, 1959  6 Sheets-Sheet 1

INVENTORS
Johannes Bernhard Decker
Heinz Meder
Melchior Wilhelm Jakobs

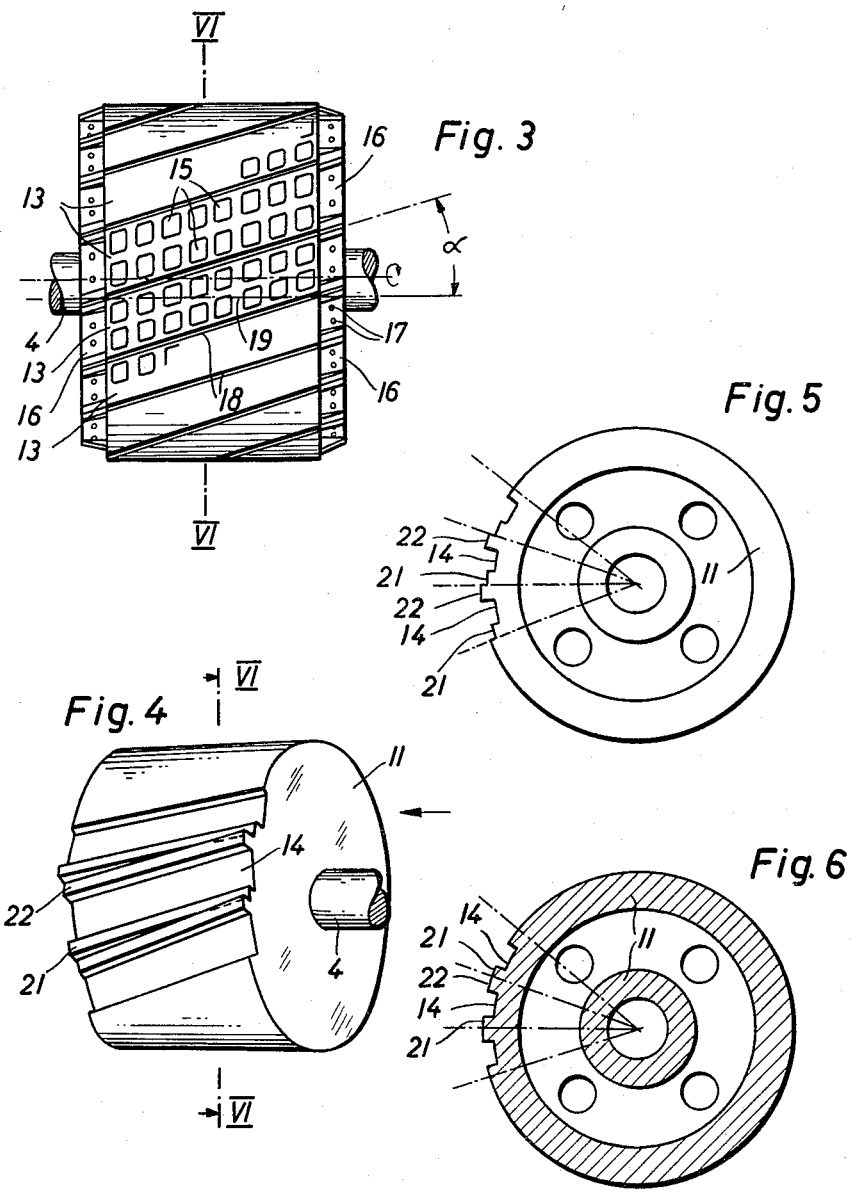

Nov. 8, 1960 J. B. DECKER ET AL 2,958,902
ROLLER PRESS FOR THE BRIQUETTING OF
ORE, COAL OR SIMILAR MATERIALS
Filed Feb. 19, 1959 6 Sheets-Sheet 3

INVENTORS
Johannes Bernhard Decker
Heinz Meier
Melchior Wilhelm Jokote

Nov. 8, 1960  J. B. DECKER ET AL  2,958,902
ROLLER PRESS FOR THE BRIQUETTING OF
ORE, COAL OR SIMILAR MATERIALS
Filed Feb. 19, 1959  6 Sheets-Sheet 4

INVENTORS

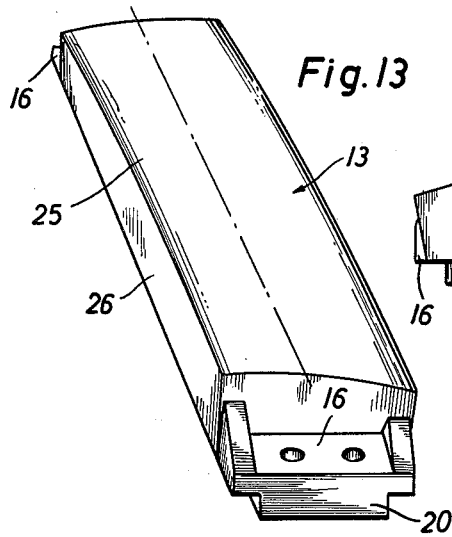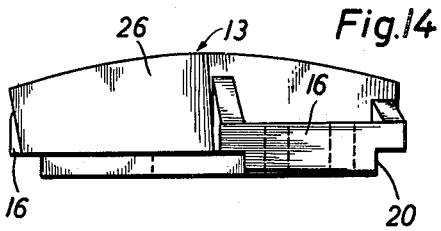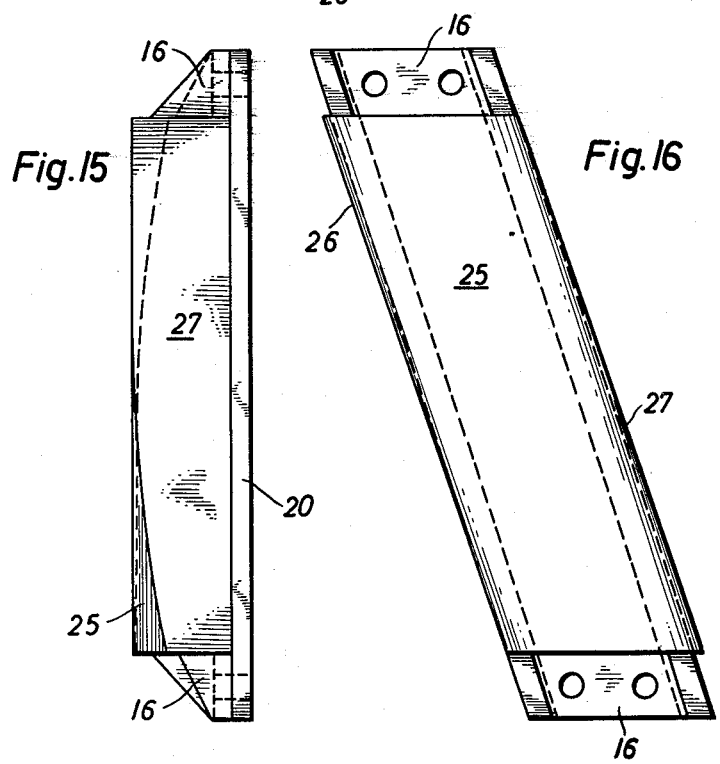

Nov. 8, 1960   J. B. DECKER ET AL   2,958,902
ROLLER PRESS FOR THE BRIQUETTING OF
ORE, COAL OR SIMILAR MATERIALS
Filed Feb. 19, 1959   6 Sheets-Sheet 6

INVENTORS
Johannes Bernhard Decker
Heinz Meder
Melchior Wilhelm Jakobs

United States Patent Office

2,958,902
Patented Nov. 8, 1960

2,958,902

ROLLER PRESS FOR THE BRIQUETTING OF ORE, COAL OR SIMILAR MATERIALS

Johannes Bernhard Decker, Koln-Rath, Heinz Meder, Koln-Hohenhaus, and Melchior Wilhelm Jakobs, Wahn-Heide, Germany, assignors to Klockner-Humboldt-Deutz Aktiengesellschaft, Koln-Deutz, Germany, a corporation of Germany Filed Feb. 19, 1959, Ser. No. 794,294

Claims priority, application Germany Feb. 21, 1958

5 Claims. (Cl. 18—21)

Our invention relates to a roller-type press for the briquetting of ore, coal and other materials in which each of the two cooperating press rollers possesses on its periphery a ring composed of exchangeable segments that contain the cavities for molding the briquettes.

The present invention is an improvement over roller briquetting presses according to application Serial No. 686,212, filed September 25, 1957, and assigned to the assignee of the present invention.

In known presses of this type, the separation gap between the segments of each roller extends in a plane passing through the axis of the roller. During operation, one of the separation gaps of one roller is located over its entire length opposite a separation gap of the other roller in the narrowest place of the pressing space between the rollers. Although the irregularity caused by the separation gaps is slight, it imposes its effect upon the full axial length of the rollers so that the roller bearings are subjected to non-uniform forces and hence to considerable wear.

It is an object of our invention to improve roller presses of the above-mentioned type by minimizing the variations in pressure acting upon the bearings and thus increasing their useful life.

To this end, and in accordance with our invention, the separation gaps between the segments located at the peripheral surface of each roller and extending from one to the other axial end of the roller are designed to extend parallel to each other in such a direction that they form an acute angle with the cylinder generatrices that are parallel to the roller axis, the surface area of each segment in the peripheral surface of the briquetting roller, in planar development, having approximately the shape of a parallelogram.

As a result, the mutual point of contact between those separation gaps of the respective rollers that are located at any one time in the active interspace and hence in the zone of maximum pressure, travels along the two separation gaps from one to the other axial side of the rollers. The separation gaps therefore face each other in the pressure space between the rollers only along a small portion of their total length. The irregular forces stemming from the pressing action thus act only upon a negligible portion of the roller length and thus have no appreciable effect upon the stresses imposed upon the bearings. In other words, the pressure occurring in the active interspace between the rollers is uniformly distributed over the entire length of the rollers to a great extent. The invention is therefore particularly advantageous for roller presses operating with a very high briquetting pressure.

According to another feature of the invention, the two mutually adjacent lateral surfaces of neighboring segments form narrow gaps, and these lateral faces are left in the unmachined state. As a result the segments, consisting of a hard material, can be more readily produced because it is not necessary to machine the lateral surfaces of the segments by cutting tools.

In a preferred embodiment of the invention, each segment on its bottom side facing the roller body, engages the roller body in form of a tongue-and-groove engagement. The tongue-and-groove joints are preferably given a stepped shape so as to form shoulder faces on both sides along each segment. Each segment rests either with its bottom surface upon the bottom surface of the groove, or the shoulder faces on both sides of the groove (shoulder faces of the segment) rest upon the respective shoulder faces of the roller body. According to a further feature of the invention, the tongue-and-groove joints, including the appertaining contact faces, are so designed and located that they possess exclusively straight edges and planar surfaces in order to permit machining these surfaces in the simplest manner.

Each segment is provided with at least one row of mold cavities extending parallel to the separation gaps of the segment. Between one of the cavity rows and the adjacent separation gap there remains a ridge; and the adjacent segment possesses a similar ridge. As a result, the total width occupied by the ridges between each two cavity rows, separated by a separation gap, is greater than the width of the ridge formed between two cavity rows of one and the same segment if the segment is provided with two or more such rows. While this arrangement, in the known presses, may cause pressure variations and impacts, such detriments are avoided by virtue of the present invention because at any particular time only a very short portion of the described double ridge is located opposite a corresponding double ridge of the other briquetting roller. Furthermore, even those ridges that are formed between two adjacent mold-cavity rows of one and the same segment, the same advantage is achieved because these ridges face each other in the active pressure space likewise only along a very short distance.

In one known type of roller briquetting press, the mold cavities, in top view, have elliptic shape and are so arranged in the segments that they form cavity rows extending at an angle to the roller axis, these segments being inserted into the roller by a type of tongue-and-groove engagement.

In accordance with another feature of our invention, the mold cavities have a substantially parallelogram-shaped cross section relative to cylinder sections extending parallel to the surface of the segments. This parallelogram-shaped cross section has its lateral edges extending parallel to the contour of the segment surface, whereas the cross sections of the cavities taken parallel to the lateral edges are formed by circular arcs of respectively different radii. This has the effect that the briquettes more readily disengage themselves from the mold cavities and the briquettes consequently show less tendency to become cracked.

We are aware of the fact that it is known as such to give the bottom area of the mold cavities the shape of a circular arc in the longitudinal direction, in roller presses for the production of egg-shaped briquettes in which these cavities have elliptic shape in top view.

The segments are preferably provided at both ends, beside the mold cavities, with extensions which permit fastening the segments to the roller body by means of screw bolts. This has the advantage that the pressure bodies of the segments in which the mold cavities are located, are not interrupted and weakened by bores for fastening screws.

The above-mentioned and more specific features of the invention will be described hereinafter with reference to the embodiment of a briquetting press according to the invention illustrated by way of example on accompanying drawings in which:

Fig. 3 is a plan view onto one of the briquetting rollers of the press, provided with mold-cavity segments.

Fig. 4 is a schematic and perspective view of the briquetting roller according to Fig. 3, but without the segments.

Fig. 5 is a front view of the roller body of Fig. 4 seen in the direction of the arrow in Fig. 4.

Fig. 6 is a cross section of the roller body taken along the line VI—VI indicated in Figs. 3 and 4.

Fig. 13 is a perspective view of one of the segments.

Fig. 14 is a front view of the segment shown in Fig. 13.

Fig. 15 is a lateral view of the same segment.

Fig. 16 is a top view onto the segment shown in Fig. 13.

Figure 1:
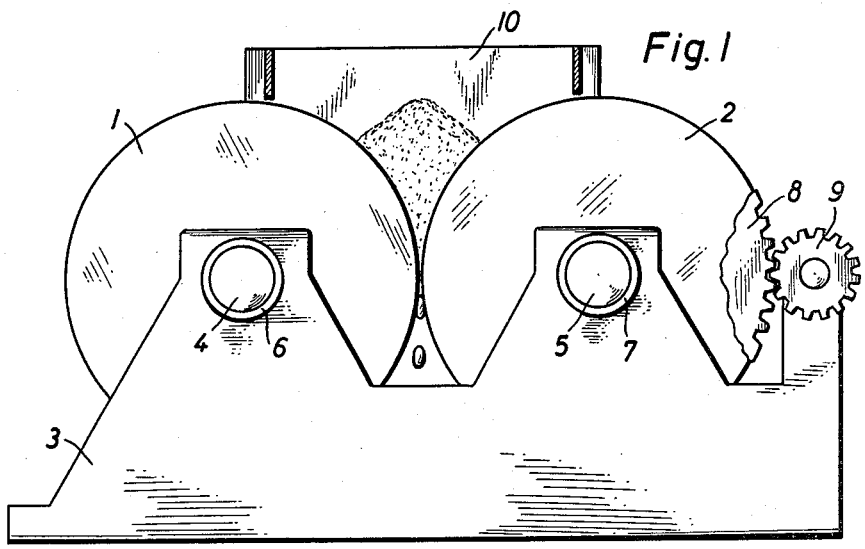
Fig. 1 is a lateral and schematically simplified view of a briquetting press according to the invention.
Figure 2:
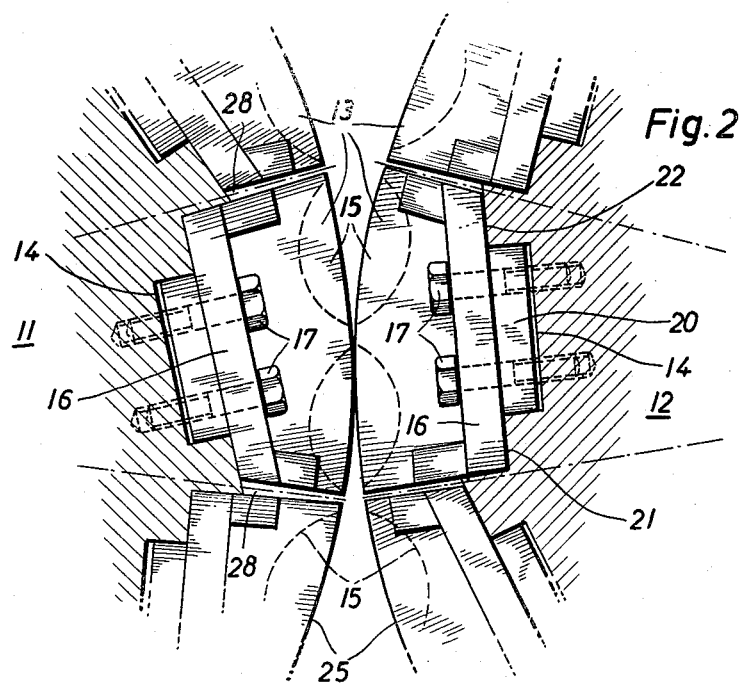
Fig. 2 is a partial and partly sectional view of a detail taken from Fig. 1 on enlarged scale.

The illustrated roller-type briquetting press comprises two briquetting rollers 1 and 2 (Fig. 1) fastened on respective shafts 4 and 5, which are journalled in respective bearings 6 and 7 of the machine frame structure 3. Each shaft carries a spur gear 8 in coaxial relation to the roller but slightly spaced therefrom. The two spur gears 8 have equal diameters and are in meshing engagement with each other so that the two rollers 1, 2 rotate in mutually opposed directions. The spur gear 8 on shaft 5 meshes with a driving pinion 9 likewise journalled in the machine frame 3 which is connected with a drive motor (not illustrated). Mounted above the two rollers 1 and 2 is a hopper or other material feeder device 10 which is illustrated in Fig. 1 in greatly simplified manner.

As is particularly apparent from Figs. 2 to 6, each briquetting roller is composed of a roller body 11 or 12 (Fig. 2) which is firmly fastened to its shaft 4 or 5, for example with the aid of wedges. Each roller further comprises a ring formed of a number of individual segments 13 and closely surrounding the roller body. The roller body 11 or 12 is made of structural steel or a steel casting of conventional constitution which can be machined with the aid of cutting tools so that grooves 14 can be milled into the peripheral surface of the roller body in a manner similar to the manufacture of spur gears.

The individual segments are provided on their outer surface 25 with a number of mold cavities 15 for receiving the material to be briquetted. Each segment possesses at least one series of such mold cavities which extends parallel to the gap edges 18 of the segment. For simplicity of illustration, the mold cavities are omitted in Figs. 12 to 16. Each segment 13 has extensions 16 (Figs. 13 to 16) located laterally of the mold cavities 15 and serving for attaching the segment to the roller body. For this purpose, the extensions 16 have bores traversed by screw bolts 17 (Fig. 2) which firmly and rigidly secure the segment to the roller body 11 or 12, but permit removing the segment if necessary. This manner of fastening has the advantage that the pressure body proper of the segment, formed by its central portion carrying the mold cavities, is not interrupted by bores or the like, thus avoiding the danger that the segment may be damaged or destroyed at such weakened locations.

As is particularly apparent from Fig. 3, the segments 13 are so shaped, according to the invention, that the separation gaps 18 between the segments, extended from one to the other frontal surfaces of the roller, extend in parallel relation to each other, but form an acute angle $\alpha$ (Fig. 3) together with the generatrices 19 of the cylindrical roller structure, so that the surface area of each segment on the periphery of the briquetting roller forms substantially a parallelogram when developed to a planar illustration.

In the illustrated embodiment, each segment 13 is provided with two rows of mold cavities. These two rows extend parallel to the separation-gap edges of the segment 13, which edges are denoted in Fig. 3 by the same reference numeral 18 as applied to the gaps themselves. The ridges remaining between the individual cavities 15 thus extend in part at a right angle to the generatrices 19 and in part parallel to the gap edges 18 of the segments 13. The angle $\alpha$ is about 15° to about 20°. This has the effect that at any particular time only a small portion of an individual separation gap or of an individual longitudinal ridge extending parallel to the gaps is located within the active pressure gap between the two briquetting rollers. With a direction of rotation as indicated by an arrow in Fig. 3 at the right-hand end of shaft 4, the point of contact between two such ridges of the respective rollers, or between two such separation gaps of the rollers, enters into the compressing interspace of the respective rollers at the right-hand front side of the roller, and then travels during the rotating motion of the roller gradually over its entire length through the compression space from the right toward the left in order to then leave the compression space at the left-hand side of the roller. Only after the one ridge or the one separation gap has thus passed through the active interspace between the two briquetting rollers will the next ridge or separation gap enter into this active space.

On the side facing the roller body, each segment 13 possesses a projection which engages a groove 14 machined into the roller body. These grooves 14 serve to maintain the segments 13 always at the correct distance from each other and to reliably secure them on the roller body against displacement in the peripheral direction. As shown (Fig. 12) the groove 14 and the projection 20 are preferably given a stepped shape to form shoulder faces 21 and 22 (Fig. 11) on both sides respectively of each groove. The dimensions are so chosen that the segment 13 rests upon the roller body either with the bottom surface of the projection 20 or with the two shoulder faces resting upon the faces 21 and 22, thus transferring the pressure forces resulting from the briquette-pressing operation from the segment onto the roller body.

Figure 7:
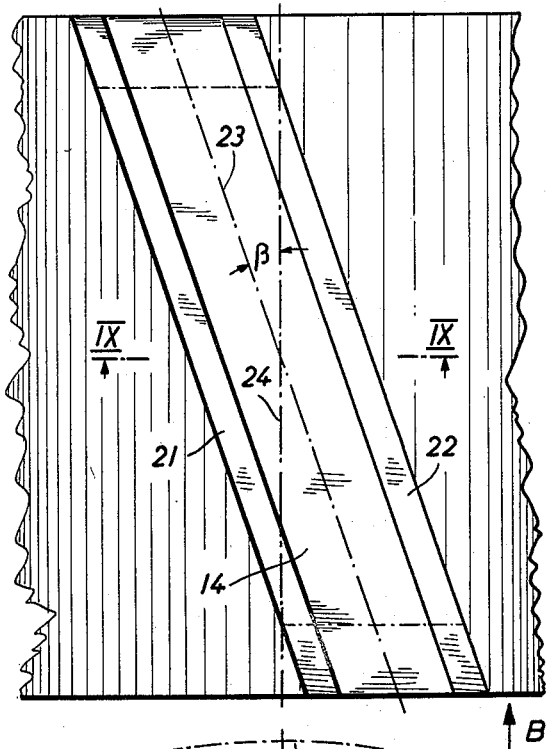
Fig. 7 is a top view onto a groove machined into the roller body and to be occupied by one of the segments.
Figure 8:
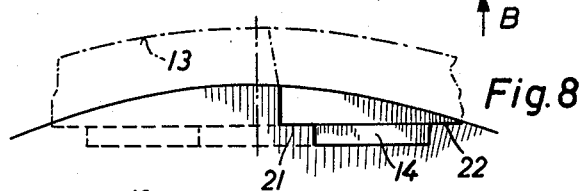
Fig. 8 is a view of part of Fig. 7 seen in the direction of the arrow B.
Figure 9:
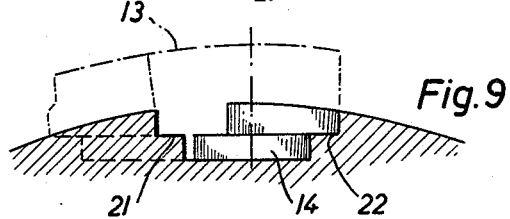
Fig. 9 shows part of a cross section taken along the line IX—IX in Fig. 7.
Figure 10:
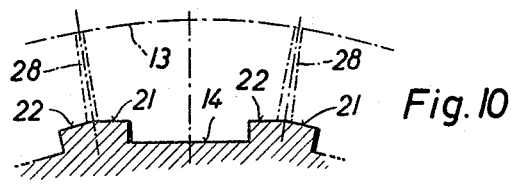
Fig. 10 is a section along the line IX—IX of Fig. 7 as it results when in addition to the groove shown in Fig. 7 the two next adjacent grooves are likewise machined into the roller body.

The groove 14 and the projection 20, including the appertaining shoulder faces 21 and 22, are preferably so shaped and located according to the invention that they possess exclusively straight edges and planar surfaces. The design is such (Figs. 7 and 10) that the bottom surface of the groove 14 or of the projection 20 is located in a plane that extends at a uniform distance from, and in parallel relation to, the roller axis, the longitudinal center line 23 (Fig. 7) of this bottom surface defining an angle $\beta$ together with the line 24 that extends in the same plane parallel to the roller axis. This intersection angle $\beta$ is preferably equal to the angle $\alpha$ (Fig. 3) formed by the separation gaps 18 between the individual segments 13 together with the generatrices 19 that are parallel to the roller axis. The two shoulder or pressure-receiving faces 21 and 22 located on both sides along the groove 14 and the projection 20 are preferably parallel to the bottom surface of the groove 14 or the projection 20. This makes it possible to produce the groove, projection and shoulder faces exclusively by longitudinal machining by means of milling cutters parallel to the bottom surface of the groove or projection. The location of the individual grooves 14 and the shoulder faces 21, 22 relative to the peripheral surface of the roller body is best apparent from Fig. 11.

Figure 11:
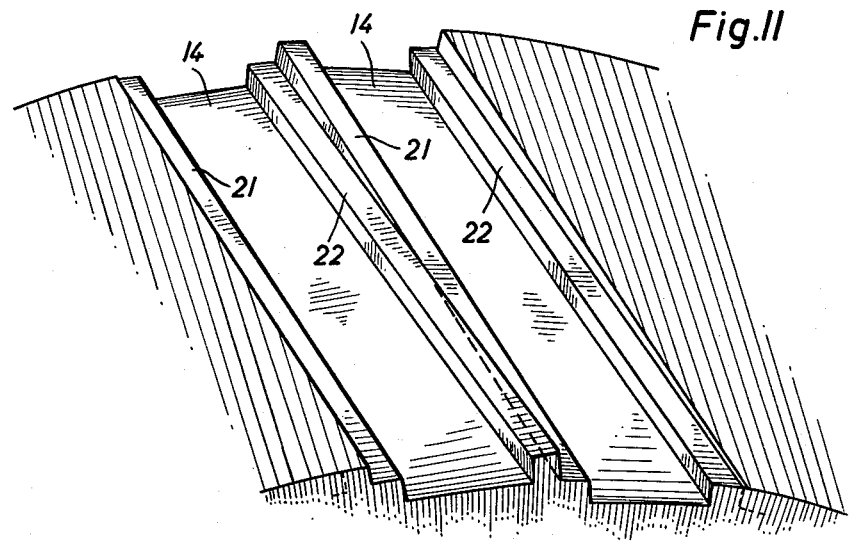
Fig. 11 is a perspective view of two adjacent grooves machined into the roller body.
Figure 12:
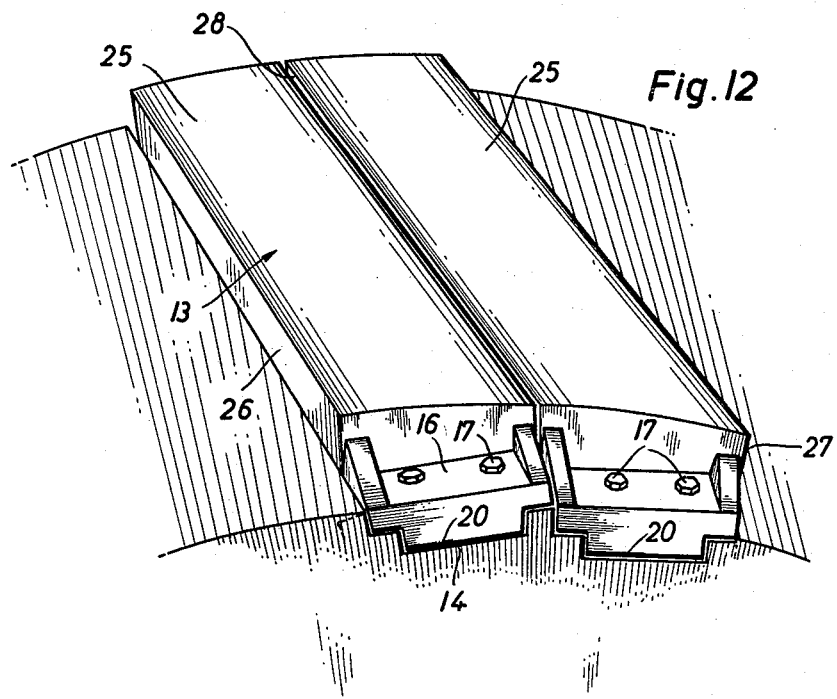
Fig. 12 is a view corresponding to that of Fig. 11 but showing the segments inserted into the respective grooves.
Figure 17:
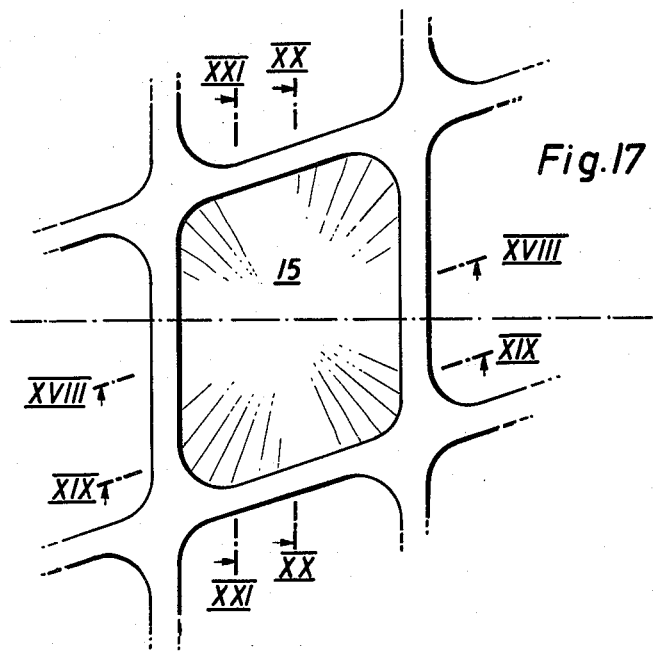
Fig. 17 is a top view of one of the mold cavities according to Fig. 3 on enlarged scale.
Figures 18, 19:
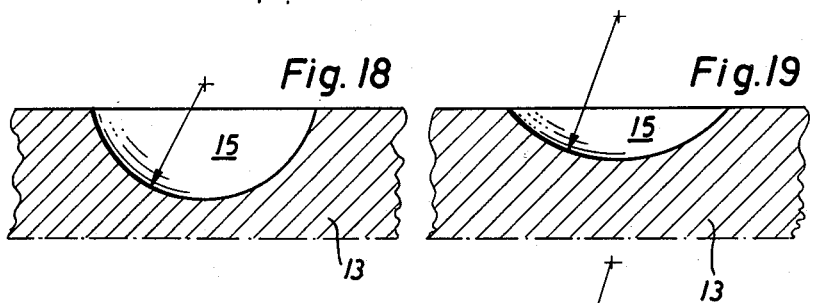
Fig. 18 is a section along the line XVIII—XVIII of Fig. 7.
Fig. 19 is a section along the line XIX—XIX of Fig. 17.
Figures 20, 21:
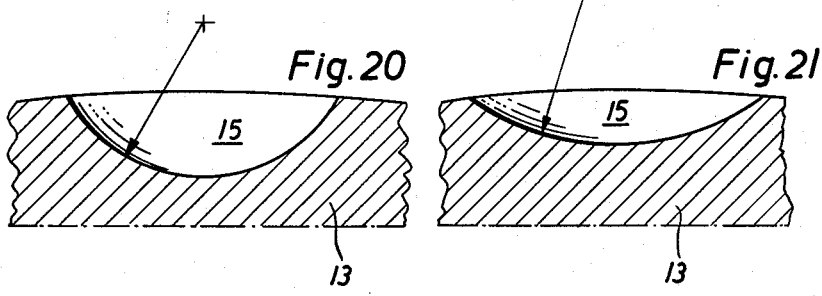
Fig. 20 is a section along the line XX—XX of Fig. 17.
Fig. 21 is a section along the line XXI—XXI of Fig. 17.

Once the number and the parallelogram shape of the segments 13 is chosen, the corresponding division of the roller periphery for the grooves 14 and shoulders 21, 22 to be machined into the roller body is likewise definitely determined, and the position and the orientation of the grooves 14 and faces 21, 22 then result constrainedly according to Fig. 11, it being necessary to consider that always sufficient material is available at the periphery of the roller body to permit machining the depth and width of the groove 14 as well as the width of the shoulder faces 21 and 22. In other words, the plane in which the bottom surface of the groove 14 extends must be given sufficient spacing from the periphery of the roller body. Of particular importance in this respect is the slanting position of the segments 13 and grooves 14 relative to the roller axis, i.e., the angles $\alpha$ and $\beta$ which are preferably of the same size.

Aside from the straight edges and planar surfaces of the projection 20 at the lower side of each segment 13 and the shoulder faces 21, 22 and the projection 16, the segment body proper, aside from its lateral ends, has spatially curved surfaces, namely, the surfaces 25 which receive the mold cavities, and the skewed lateral surfaces 26 and 27 determined by the angle $\alpha$. The individual segments are preferably so dimensioned that small gaps 28 (Fig. 12) remain between the non-planar lateral surfaces 26 and 27 of adjacent segments, these small gaps being located in the separation gaps 18 above the groove 14 and the projection 20. The size of the narrow gap 28 is so chosen that the lateral surfaces 26 and 27 can be left unmachined. This is a particular advantage in view of the fact that the segments are preferably made of a hard and highly wear-resistant cast iron or cast steel material with a hardness of approximately 54 to 62 Rockwell, or 600 to 800 kg./mm.$^2$ Vickers hardness scale. Such materials, due to their hardness, can be machined only with difficulty by chip-removing tools.

The surfaces of the segments that are to be in contact with the roller body are preferably first ground before fastening the segments. After assembling the roller, the ring formed by the segments is accurately ground on its peripheral surface to cylindrical shape.

The manufacture of the segments from casting material, as already indicated, has the advantage that the final shape of the segments can be produced with accuracy directly during the casting operation.

The narrow gaps remaining between the segments in the separation area fill themselves rapidly with briquetting material when putting the press into operation, thus imparting to the rollers a smooth and fully closed surface. In some cases it is also advantageous to cast a non-ferrous metal, for example, copper, into the gaps, which metal has approximately the same thermal coefficient of expansion as the casting material used for the segments. In this manner any briquetting material can be prevented from being lodged between the segments.

The mold cavities 15 machined into the cylindrical peripheral surfaces of the segments have a parallelogram-shaped cross section formed with circular-shaped sections perpendicular to the peripheral segment surface, the edges of the parallelograms extending parallel to the contour of the cylindrical surface of the segment. The cross sections of the mold cavities taken parallel to the lateral sides of the cavities are circular arcs of respectively different radii (Figs. 17 to 21).

It will be obvious to those skilled in the art upon a study of this disclosure, that the invention permits of various modifications with respect to details and hence may be embodied in briquetting presses other than the one particularly illustrated and described herein, without departing from the essence of the invention and within the scope of the claims annexed hereto.

We claim:
1. Roller press for the briquetting of ore, coal and other hard materials and equipped with a pair of substantially cylindrical briquetting rollers, each roller comprising a roller body having mounted on its periphery a plurality of spaced individual exchangeable segments provided with mold cavities for producing briquettes, each of said segments and its corresponding roller forming tongue and groove means at their mutually abutting surfaces for insertion and peripheral retention of said segments, the mutually adjacent lateral edges of peripherally successive segments being spaced from each other sufficiently for as-cast tolerances in the maximum peripheral width of each segment and defining separation gaps between said segments so as to provide no mutual peripheral support between peripherally successive segments, said gaps extending from one to the other axial side of said roller, said lateral edges of said segments being parallel to each other, and the centerlines of said gaps forming an acute angle with the roller cylinder generatrices which are parallel to the respective roller axis, so that the surface area formed by each segment at the peripheral surface of the roller forms approximately a parallelogram in planar development.

2. Roller briquetting press according to claim 1, said separation gaps forming narrow interspaces between said mutually adjacent lateral edges of said segments, the surfaces forming said lateral edges being in the as-cast unmachined state.

3. Roller press for the briquetting of ore, coal and other hard materials and equipped with a pair of substantially cylindrical briquetting rollers, each roller comprising a roller body having mounted on its periphery a plurality of spaced individual exchangeable segments provided with mold cavities for producing briquettes, each of said segments and its corresponding roller forming tongue and groove means at their mutually abutting surfaces for insertion and peripheral retention of said segments, the mutually adjacent lateral edges of peripherally successive segments being spaced from each other sufficiently for as-cast tolerances in the maximum peripheral width of each segment and defining separation gaps between said segments so as to provide no mutual peripheral support between peripherally successive segments, said gaps extending from one to the other axial side of said roller, said lateral edges of said segments being parallel to each other, and the centerlines of said gaps forming an acute angle with the roller cylinder generatrices which are parallel to the respective roller axis, so that the surface area formed by each segment at the peripheral surface of the roller forms approximately a parallelogram in planar development, said tongue-and-groove means being a joint of stepped formation, the bottom surfaces of said segments forming said joint and the surfaces of said roller body forming said joint each having exclusively straight edges.

4. Roller press for the briquetting of ore, coal and other hard materials and equipped with a pair of substantially cylindrical briquetting rollers, each roller comprising a roller body having mounted on its periphery a plurality of spaced individual exchangeable segments provided with mold cavities for producing briquettes, each of said segments and its corresponding roller forming tongue and groove means at their mutually abutting surfaces for insertion and peripheral retention of said segments, the mutually adjacent lateral edges of peripherally successive segments being spaced from each other sufficiently for as-cast tolerances in the maximum peripheral width of each segment and defining separation gaps between said segments so as to provide no mutual peripheral support between peripherally successive segments, said gaps extending from one to the other axial side of said roller, said lateral edges of said segments being parallel to each other, and the centerlines of said gaps forming an acute angle with the roller cylinder generatrices which are parallel to the respective roller axis, so that the surface area formed by each segment at the peripheral surface of the roller forms approximately a parallelogram in planar development, said tongue-and-groove means being a joint of stepped formation, the bottom surfaces of each of said segments comprising a tongue and two shoulder portions and the peripheral surfaces of said roller body comprising corresponding grooves and shoulder portions for engaging the bottom surfaces of said segments, the contiguous surfaces of said tongue-and-groove joint being all of planar formation.

5. Roller press for the briquetting of ore, coal and other hard materials and equipped with a pair of substantially cylindrical briquetting rollers, each roller comprising a roller body having mounted on its periphery a plurality of spaced individual exchangeable segments provided with mold cavities for producing briquettes, each of said segments and its corresponding roller forming tongue and groove means at their mutually abutting surfaces for insertion and peripheral retention of said segments, the mutually adjacent lateral edges of peripherally successive segments being spaced from each other sufficiently for as-cast tolerances in the maximum peripheral width of each segment and defining separation gaps between said segments so as to provide no mutual peripheral support between peripherally successive segments, said gaps extending from one to the other axial side of said roller, said lateral edges of said segments being parallel to each other, and the centerlines of said gaps forming an acute angle with the roller cylinder generatrices which are parallel to the respective roller axis, so that the surface area formed by each segment at the peripheral surface of the roller forms approximately a parallelogram in planar development, said segments having respective extensions at each end for removably fastening said segments to said roller body.

References Cited in the file of this patent

UNITED STATES PATENTS

| | | |
|---|---|---|
| 538,475 | Albrecht | Apr. 30, 1895 |
| 1,715,297 | Kleinberg | May 28, 1929 |
| 2,203,200 | Komarek | June 4, 1940 |
| 2,662,246 | Klug et al. | Dec. 15, 1953 |
| 2,689,977 | Hubmann | Sept. 28, 1954 |
| 2,842,071 | Perky | July 28, 1958 |

FOREIGN PATENTS

| | | |
|---|---|---|
| 567,069 | Great Britain | Jan. 26, 1945 |